United States Patent [19]
Mead et al.

[11] 4,112,289
[45] Sep. 5, 1978

[54] WELDING APPARATUS

[75] Inventors: Kenneth W. Mead; K. Stewart Peters, both of El Cajon, Calif.

[73] Assignee: Carpenter Technology Corporation, Reading, Pa.

[21] Appl. No.: 777,847

[22] Filed: Mar. 15, 1977

[51] Int. Cl.² .............................................. B23K 9/00
[52] U.S. Cl. .......................... 219/124.33; 219/124.02; 219/125.11
[58] Field of Search ............ 219/124, 125 R, 125 PL, 219/60 R, 124.02, 124.33, 125.11

[56] References Cited

U.S. PATENT DOCUMENTS

| | | | |
|---|---|---|---|
| 2,280,627 | 4/1942 | Chapman | 219/124 |
| 2,680,182 | 6/1954 | Chambers | 219/124 |
| 2,927,195 | 3/1960 | Arnaud | 219/124 |
| 2,927,992 | 3/1960 | Bateman | 219/125 PL |
| 3,126,472 | 3/1964 | Brems | 219/124 |

FOREIGN PATENT DOCUMENTS

| | | | |
|---|---|---|---|
| 924,707 | 3/1955 | Fed. Rep. of Germany | 219/125 R |
| 2,011,861 | 10/1971 | Fed. Rep. of Germany | 219/125 R |

*Primary Examiner*—J. V. Truhe
*Assistant Examiner*—Clifford C. Shaw
*Attorney, Agent, or Firm*—Edgar N. Jay

[57] ABSTRACT

Automatic welding apparatus for making uniform welds around the perimeter of a polygonal shape made up of a succession of flats and arcuate corners is described in connection with a tubular hexagonal workpiece which is rotated about its longitudinal axis beneath a welding torch assembly. The distance of the welding electrode above the workpiece is maintained as preselected by automatic voltage control means. The welding electrode is automatically maintained perpendicular to a tangent to the surface of the workpiece and extending in the plane of the weld line by oscillating the welding torch assembly so that its longitudinal axis describes an arc having its center on the longitudinal axis of rotation of the workpiece in synchronization with the rotation of the workpiece. Synchronization is provided by means of an annular cam surface which is rotated in predetermined relation to the workpiece and which controls the oscillation of the welding torch assembly.

12 Claims, 3 Drawing Figures

WELDING APPARATUS

BACKGROUND OF THE INVENTION

This invention relates to an apparatus for welding non-circular shapes and, more particularly, to such an apparatus which is uniquely suited for making welds about the periphery of a polygonal shape.

Numerous equipments have hitherto been provided for controlling the rotation of a workpiece while simultaneously controlling the position of a welding torch in relation to the work for the purpose of providing uniform welds free of defects. For example, U.S. Pat. No. 2,280,627 granted Apr. 21, 1942 to V. J. Chapman relates to an automatic welding apparatus in which a workpiece is mounted on a turntable juxtaposed to the end of a welding torch or electrode with the line of the contour to be welded aligned in registration with a cam surface having a configuration corresponding to the the weld line and which controls the turntable to bring the weld line past the welding torch. The angle of the welding electrode relative to the work is adjustable, and it is automatically maintained at a predetermined distance from the workpiece by arc voltage responsive means. U.S. Pat. No. 3,126,472 granted Mar. 24, 1964 to J. H. Brems also relates to a contour welding machine. In the Brems apparatus, the speed of rotation of a workpiece is controlled by a cam, the contour of which maintains the linear rate of welding along the weld line constant despite changes in the radius of curvature of the workpiece along the weld line. Additional cams are provided to move the welding head and the welding torch carried thereby both horizontally and vertically in relation to the workpiece. Though representing different degrees of complexity, both of those machines leave much to be desired when extremely exacting welding standards are to be met. Although both machines provide an arrangement for maintaining the electrode-to-workpiece distance constant, neither provides any arrangement for maintaining the instantaneous attitude of the electrode to the workpiece constant during welding with a consequent impairment of the weld resulting from variations in weld penetration.

SUMMARY OF THE INVENTION

It is, therefore, a principal object of this invention to provide an improved, yet relatively simple, welding apparatus in which the electrode-to-workpiece distance or arc gap is maintained substantially constant by means of a conventional automatic voltage controller responsive to changes in the voltage across the arc gap and in which the instantaneous attitude of the electrode to the surface of the workpiece is maintained substantially constant.

DESCRIPTION OF THE DRAWINGS

Further objects and advantages of the present invention will be apparent from the following description of a preferred embodiment thereof and the accompanying drawings in which.

DETAILED DESCRIPTION OF A PREFERRED EMBODIMENT

Figure 1:
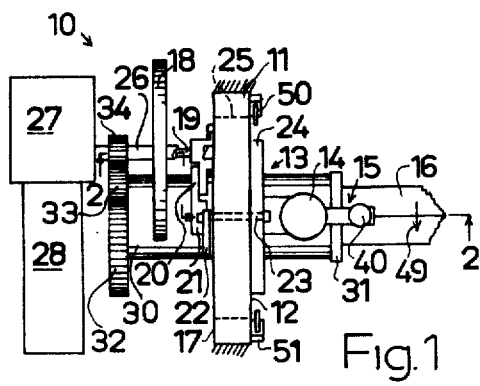
FIG. 1 is a top plan view, partially diagrammatic and partially broken away for convenience, of welding apparatus constructed in accordance with the present invention.

Referring to the drawings in detail, welding apparatus 10 comprises a vertically extending support member 11 fixed and supported in position by suitable support means indicated diagrammatically in the drawing. On the front (right as viewed in FIGS. 1 and 2) surface 12 of support member 11, there is slidably mounted an oscillating assembly 13 on which is supported an automatic voltage control assembly 14 which, in response to changes in the voltage across the welding-arc gap, moves the welding torch holder 15 toward or away from a workpiece 16 to restore the desired voltage across the arc gap. On the rear surface 17 of support member 11, a cam plate or disc 18 is rotatably supported in operative engagement with a cam follower 19 connected to an arm 20 of a bell crank assembly 21, the longer arm 22 of which is connected by an actuator shaft 23 to a support plate 24 forming part of the oscillating assembly 13. The bell crank assembly 21 is pivotally mounted on the rear surface 17 of support member 11 so that vertical displacement of the end of its arm 20 with cam follower 19 causes lateral displacement of the end of the longer bell crank arm 22 and the oscillating support plate acutator shaft 23, the latter extending through an arcuate slot 25 formed in support member 11.

The rotatable mounting of the cam plate 18 is conveniently provided by means of a shaft 26, one end of which is rotatably supported on the support member 11 and the other end of which is coupled to the output shaft of a gear drive 27 connected to a variable speed motor 28. Workpiece support and drive means includes a tubular drive shaft 30, cylindrical as shown, one end of which carries a collar 31 or other suitable coupling means for engaging the workpiece 16 so as to support and rotate the same about its longitudinal axis which advantageously extends horizontally. The drive shaft 30 adjacent its opposite end is connected to driven gear 32 in mesh with idler gear 33 which, in turn, meshes with a drive gear 34 fixed to cam plate shaft 26. It is to be understood that any suitable power train can be used; however, the arrangement shown and described is preferred because of its inherent simplicity and assurance of synchronization between the cam plate 18 and the workpiece 16.

The present invention, for purposes of exemplification, is shown and described in connection with a hexagonal, tubular workpiece of regular configuration. The gear train made up of the 3 gears 32–34 are proportioned to provide that, during six revolutions of the shaft 26 and the cam plate 18 carried thereby, the tubular drive shaft 30 and the workpiece 16 connected to it make one complete revolution. When it is desired to adjust the relationship or synchronization of cam plate 18 and workpiece 16, the idler gear 33 is disengaged from the drive gear 34 and the driven gear 32 thereby permitting rotation of either with respect to the other. When the desired orientation is reached, the gears are remeshed so that further rotation of the one must be in synchronization with the other.

The face of cam plate 18 presented toward support member 11 has a cam groove or surface 35 formed therein in which cam follower 19 engages and which actuates the latter to cyclically travel a predetermined path which extends vertically the distance required to impart to the long, upper bell crank arm 22 and the actuator shaft 23 connected thereto, the cyclical lateral displacement through which the support plate 24 is required to be oscillated as will be more fully pointed out hereinbelow. In the case of the illustrative hexagonal workpiece 16 having six equal sides and six round corners of equal radius, the cam surface 35 and the proportions of the bell crank 21 are constructed to place the actuator shaft 23 and the support plate 24 connected thereto at the midpoint of their to-and-fro travel twice during each revolution of cam plate 18. One such position as is shown in the drawings, is with the welding torch holder 15 and the welding torch assembly 40 centered over the center line of a corner of the workpiece and, in the plane parallel to or which includes the path traced by the weld about the workpiece, forming a 90° angle with the surface of the workpiece directly under the welding electrode. If the 0° point of the cam surface be that under the center of the cam follower 19 as shown in FIG. 2, then the 180° point is directly opposite near the top of cam plate 18 and corresponds to the second point on the cam surface 35 when actuator shaft 23 is at its midpoint, and this in turn will be aligned with the center of each flat or side of the hexagonal workpiece 16.

Figure 3:
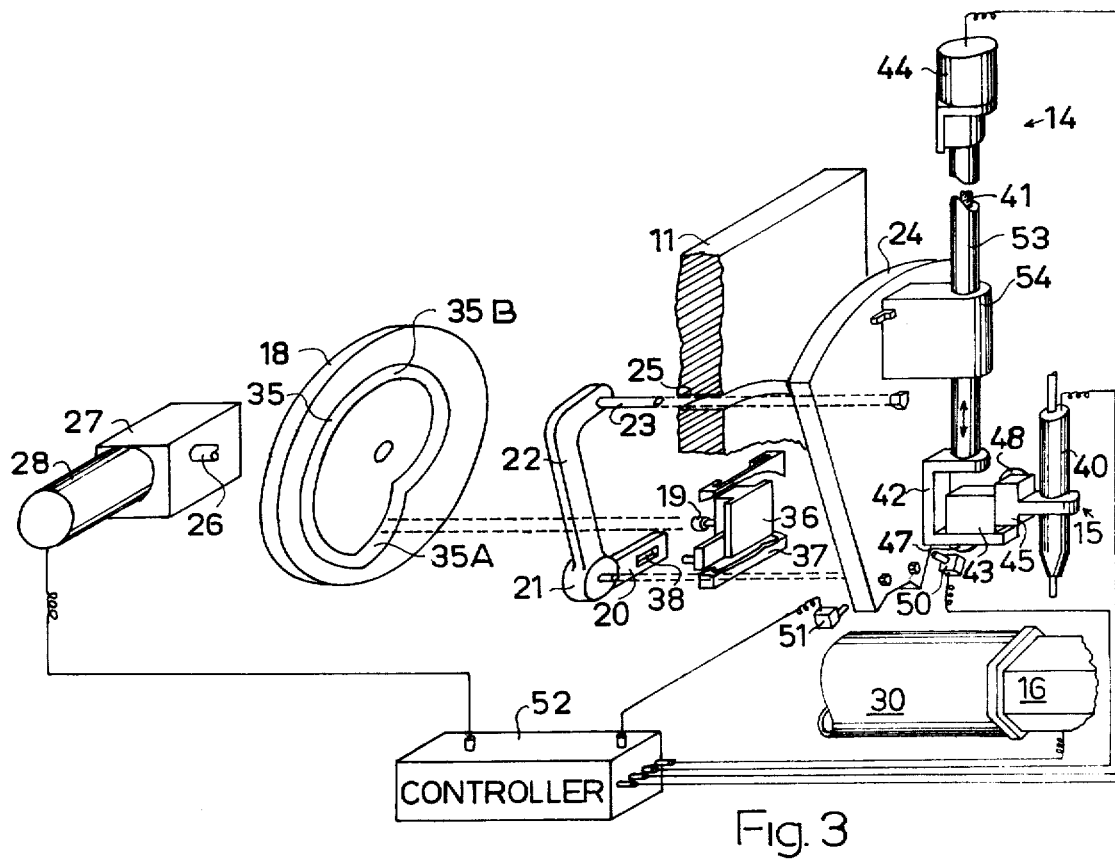
FIG. 3 is an exploded view on an exaggerated scale showing the linkage between the cam and the oscillating parts controlled thereby and also diagrammatically showing the electrical control circuit.

Precise relationship between the position of cam follower 19 and actuator shaft 23 is provided by means of a block 36 which carries the cam follower 19 and which is vertically slidable in slideway 37 carried on the rear face 17 of support member 11. The slide block 36 is connected to the end of the lower bell crank arm 20 and, by its vertical reciprocation in slideway 37, causes the bell crank 21 to rotate first in one direction, then in the opposite direction through a predetermined arc which causes a corresponding lateral displacement of the remote end of the upper bell crank arm 22. Depending upon the relative proportions of the two arms of the bell crank assembly 21, the lateral displacement of the actuator shaft 23 will be more or less greater than the vertical displacement of cam follower 19. An elongated slot 38 is provided in the lower bell crank arm 20 as shown in FIG. 3 to permit some displacement thereof along its arcuate path relative to the block 36 which is constrained to follow a vertical path.

Figure 2:
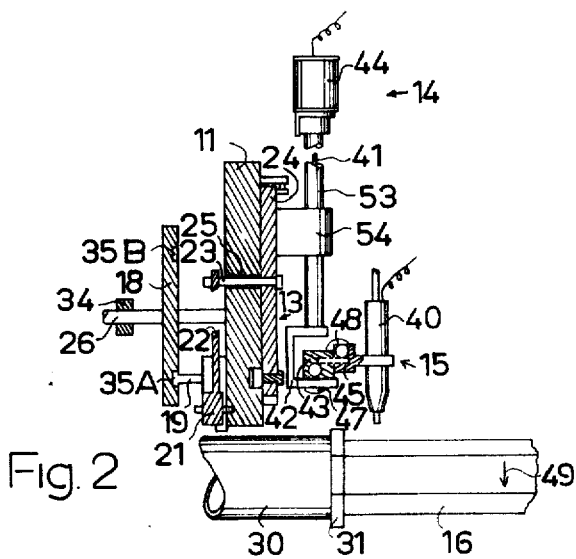
FIG. 2 is a cross-sectional view taken along the line 2—2 of FIG. 1.

As shown most clearly in FIGS. 1 and 2, automatic voltage control assembly 14 is positioned with its drive shaft 41 extending vertically in and in threaded engagement with a support tube 53 carrying servomotor 44. The support tube 53 is fixed against rotation relative to and extends in vertically movable relation through bracket 54 so as to be aligned with the vertical center line of the oscillating support plate 24. The welding torch holder 15 is carried by the lower end of the assembly 14 and comprises a support frame 42 carrying a block 43 horizontally movable transverse to the longitudinal axis of the workpiece 16. Block 45 which carries welding torch assembly 40 is movably connected to block 43 for movement parallel to the longitudinal axis of workpiece 16. Depending upon the direction in which shaft 41 is rotated by servomotor 44, support tube 53, support frame 42 together with the blocks 43 and 45 are raised or lowered as is also the welding torch assembly 40 carried thereby. Two vernier screws, one carrying knob 47 and, the other, knob 48 provide for small horizontal adjustments of blocks 43 and 45, respectively, at right angles to each other to accurately align the welding torch with the workpiece 16 during start-up.

Automatic voltage control assembly 14 and welding torch assembly 40 are well known instrumentalities the details of which form no part of the present invention. Suffice it to say here that with the welding torch positioned to provide the desired arc and voltage gap at, say, the center line of a corner of workpiece 16 as shown in the drawings, controller 52 is adjusted to provide a null or zero voltage to the servomotor 44 of the automatic voltage controller 14 so that the drive shaft 41 and the servomotor 44 remain at rest. It will be evident that, as the workpiece is rotated about its longitudinal axis, the path of the weld line about the hexagonal workpiece 16 is such that the point under the welding electrode will be cyclically vertically displaced a distance equal to the difference in length of the radii of the inscribed and circumscribed circles about the inside and outside of the workpiece 16 in the plane of the weld path. As this displacement occurs, the concomitant change in gap voltage is immediately sensed and a voltage, positive or negative depending upon the sense or direction of the change in the gap and the resultant change in gap voltage with respect to the null setting and having a duration proportional to the extent of the change, is applied to the servomotor 44 to actuate the shaft 41 in the direction and for a time long enough to restore the gap voltage and, therefore, the desired gap distance.

As workpiece 16 is rotated in the direction of arrow 49, the curvature of the corner of the workpiece 16 requires that the welding torch assembly 40 be shifted in the opposite direction through an arc in the vertical plane through the weld path and having its center on the longitudinal axis of workpiece 16. Thus, as viewed in FIG. 2, cam follower 19 is in the center of the portion 35A of cam surface 35 corresponding to the travel of a round corner of the workpiece 16 under the welding torch assembly 40. Continued rotation of cam plate 18 forces the cam follower 19 downward. As viewed from the right of FIG. 1, it will be seen that the corner of the workpiece is moving counterclockwise in its arc under the welding electrode while the oscillating assembly is being pivoted clockwise, thereby shifting the axis of the welding torch assembly clockwise from its vertical position to maintain the welding electrode perpendicular to a tangent to the curved surface of the workpiece corner directly below the electrode, the tangent extending in the plane of the weld path. As the curvature of the corner merges with the flat of the side of the workpiece 16, cam follower 19 reaches the end of cam surface portion 35A and is at the lowest point of its travel. Continued rotation of cam plate 18 causes the cam follower 19 to reverse its direction as it follows cam surface portion 35B and start upward, thereby reversing the direction of the oscillating assembly 13 and the welding torch assembly 40 carried thereby. Cam surface portion 35B corresponds to the counterclockwise movement and rotation of one of the sides or flats of the workpiece 16 as the latter is rotated under the welding electrode. It is evident that the outer surface of the workpiece flat, in its rotation counterclockwise about the axis of the workpiece, will be horizontal when its center is under the welding electrode. Thus, to coincide with and remain perpendicular thereto, the longitudinal axis of the welding torch assembly is also rotated counterclockwise and is returned to a vertical position as the center of the workpiece flat is brought into registration below it. Continued rotation of shaft 26 continues to rotate cam plate 18 and workpiece 16 counterclockwise so that, as the start of the next corner comes under the electrode, the cam follower reaches the start of cam surface portion 35A, which is its radially inner end on the cam plate 18.

To achieve a uniformly sound weld over the entire weld path, which extends around the entire periphery of the workpiece 16 for a given rate feed of weld wire and welding current, a predetermined rate of mutual travel between a flat surface of the workpiece 16 and the welding torch assembly 40 will be required and, for a given workpiece, can be readily determined by one skilled in the art. In some instances, as in the case of the hexagonal workpiece 16, it will be found that a different rate is required over the round corners. To this end, a pair of switches 50, 51 are mounted on support member front surface 12, switch 50 being positioned to be actuated by the oscillating support plate 24 as the latter reaches the end of its arc with cam follower 19 at its lowest point leaving cam surface portion 35A and entering cam surface portion 35B. As was described hereinabove, one of the flats of the workpiece will be under the welding electrode while the cam follower 19 is being raised under the influence of cam surface portion 35B, and actuation of switch 50 results in controller 52 providing that voltage to variable speed motor 28 required to provide the predetermined welding speed over the workpiece flat. As the oscillating support plate 24 reaches the opposite end of its arc, it actuates switch 51 in response to which, in the embodiment shown, the speed of the motor 28 is decreased. Having in mind that the cam surface portion 35A extends over about a 48° arc of the cam plate 18 while cam surface portion 35B extends over the remainder, it is seen that, in the absence of any change in the speed of rotation of the shaft 26, the oscillating assembly 13 would of necessity travel over the round corner of the workpiece 16 in about 13% of the time required for one complete revolution of the cam plate 18 or of the time required for 60° of rotation of the workpiece 16. With a workpiece 16 having each flat with a length about 6 times the periphery of its corners, it will be found that, at constant speed of drive shaft 26, the linear speed of the welding electrode relative to the surface of a corner will be significantly greater than the linear speed over a flat with the result that the welding speed over the corner was found in practice to be too great for a sound weld without changing the welding current and/or the weld wire feed rate. In the apparatus shown, uniformly good results were obtained by reducing the speed of rotation of shaft 26 on actuation of switch 51 and while cam follower 19 travels cam surface portion 35A and then restoring the preselected speed on actuation of switch 50 as cam follower 19 moves from cam surface portion 35A to portion 35B. In practice, with a stainless steel workpiece 16 of about 4 inches flat-to-flat and a corner radius of about ⅜ inch, travel of the weld electrode relative to the flat of the workpiece at about 3.65 in/min and, relative to the corner, at about 3.29 in/min resulted in uniform welds throughout with a desired degree of weld bead convexity.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

We claim:

1. Welding apparatus for polygonal or non-circular workpieces, comprising a welding torch assembly, means for rotating a workpiece about an axis thereof with said axis in predetermined relation to said welding torch assembly so that successive points along a predetermined path of a weld to be made along the periphery of said workpiece are rotated past said welding torch assembly and define an arc gap extending between each of said points in succession and said welding torch assembly, means responsive to changes in the distance across said arc gap from a predetermined value for moving said welding torch assembly toward or away from said workpiece to restore said predetermined value, said weld path having at least one elongated portion thereof having a substantially different radius of curvature than an adjacent portion thereof, means for adjusting the instantaneous attitude of said welding torch assembly to said path so as to maintain the same substantially perpendicular to the surface of said workpiece in the plane of said path at each of said successive points, said last mentioned means including cam means conformed for synchronization with at least a part of said weld path and a cam follower responsive thereto and linked to said welding torch assembly, and means for actuating said cam means and cam follower in predetermined synchronized relation to the rotation of said workpiece.

2. Apparatus as set forth in claim 1 in which said workpiece axis extends substantially horizontally and said welding torch assembly is supported for oscillation through a predetermined arc about a substantially horizontal axis.

3. Apparatus as set forth in claim 2 in which link means between said cam follower and said welding torch assembly includes a pair of arms connected at their adjacent ends to a common pivot with one arm connected to said cam follower and the other arm connected to said welding torch assembly, and said other arm being longer than said one arm.

4. Apparatus as set forth in claim 3 in which said other arm is substantially longer than said one arm.

5. Apparatus as set forth in claim 3 in which said weld path extends along at least one substantially flat side and one round corner of said workpiece, and means for varying the rate of relative motion between said welding torch assembly and said weld path in response to whether the weld torch assembly in traversing the flat side or round corner portions of said weld path.

6. Apparatus as set forth in claim 5 in which the rate of relative motion between the welding torch assembly and the weld path is such that the rate is substantially greater over the flat portion than over the round corner portion of said weld path.

7. Welding apparatus for polygonal workpieces, comprising a welding torch assembly, means for supporting said welding torch assembly for oscillation in a substantially vertical plane about a substantially horizontal axis, means for rotating a workpiece having a plurality of round corners separated by substantially flat sides about an axis thereof extending horizontally and below the axis of oscillation of said welding torch assembly so that successive points along a predetermined path of a weld to be made along the periphery of said workpiece are rotated past said welding torch assembly and define an arc gap extending between each of said points in succession and said welding torch assembly, means responsive to changes in the distance across said arc gap from a predetermined value for moving said welding torch assembly toward or away from said workpiece to restore said predetermined value, said weld path extending along at least one substantially flat side and one round corner of said workpiece, means for oscillating said welding torch assembly in said plane about said axis of oscillation so as to adjust the instantaneous attitude of said welding torch assembly to said path and maintain the same substantially perpendicular to the surface of said workpiece in the plane of said path at each of said successive points, said last mentioned means including cam means conformed for synchronization with at least a part of said weld path and a cam follower responsive thereto and linked to said welding torch assembly, and means for actuating said cam means and cam follower in predetermined synchronized relation to the rotation of said workpiece.

8. Apparatus as set forth in claim 7 in which said cam means has a cam surface with one portion thereof corresponding to a flat side of said workpiece and another portion thereof corresponding to a round corner of said workpiece, said welding torch assembly being oscillated in one direction when said cam follower is traversing said one portion of said cam surface and in the opposite direction when said cam follower is traversing said other portion of said cam surface.

9. Apparatus as set forth in claim 8 in which means are provided for varying the rate of relative motion between said welding torch assembly and the weld path in response to whether the weld torch assembly is traversing the flat side or the round corner of said workpiece.

10. Apparatus as set forth in claim 9 in which the rate of relative motion between the welding torch assembly and the weld path is such that the rate is substantially greater over the flat portion than over the round corner portion of said weld path.

11. Apparatus as set forth in claim 10 in which a pivotally supported bell crank links said cam follower to said welding torch assembly support means.

12. Apparatus as set forth in claim 11 in which said bell crank has unequal length arms, its shorter arm being connected to the cam follower and its longer arm being connected to said welding torch assembly support means.

* * * * *